(12) United States Patent
Xia et al.

(10) Patent No.: US 10,065,554 B1
(45) Date of Patent: Sep. 4, 2018

(54) ADJUSTABLE RATCHET TIE DOWN

(71) Applicants: Juefang Xia, Ningbo (CN); Kefeng Jin, Ningbo (CN)

(72) Inventors: Juefang Xia, Ningbo (CN); Kefeng Jin, Ningbo (CN)

( * ) Notice: Subject to any disclaimer, the term of this patent is extended or adjusted under 35 U.S.C. 154(b) by 0 days.

(21) Appl. No.: 15/468,702

(22) Filed: Mar. 24, 2017

(51) Int. Cl.
    *B60P 7/08* (2006.01)
(52) U.S. Cl.
    CPC ........... *B60P 7/0838* (2013.01); *B60P 7/0853* (2013.01)
(58) Field of Classification Search
    CPC .............................. B60P 7/0838; B60P 7/0853
    See application file for complete search history.

(56) References Cited

U.S. PATENT DOCUMENTS

| | | | | |
|---|---|---|---|---|
| 4,395,796 A * | 8/1983 | Akaura | ................ | A44B 11/125 24/265 CD |
| 4,451,956 A * | 6/1984 | Kawahara | ............ | A44B 11/125 24/302 |
| 6,195,848 B1 * | 3/2001 | Jackson | ................. | B60P 7/083 24/68 CD |
| 2005/0283951 A1 * | 12/2005 | Chang | .................. | A44B 11/125 24/68 CD |
| 2006/0026803 A1 * | 2/2006 | Chang | .................... | B25B 25/00 24/68 CD |
| 2009/0119892 A1 * | 5/2009 | Breeden | .................. | B60P 7/083 24/68 CD |
| 2011/0067210 A1 * | 3/2011 | Huang | .................... | B60P 7/083 24/68 CD |
| 2014/0000067 A1 * | 1/2014 | Hortnagl | ............... | B60P 7/0838 24/193 |
| 2015/0175050 A1 * | 6/2015 | Eenigenburg | ......... | B60P 7/0838 24/69 CT |

* cited by examiner

*Primary Examiner* — David M Upchurch
(74) *Attorney, Agent, or Firm* — Wang Law Firm, Inc.

(57) ABSTRACT

An adjustable tie-down ratchet includes a mainframe and a binding strap, wherein the mainframe includes an adjusting buckle, a handle and a transmission mechanism; a fixed shaft and a movable shaft are arranged on the rear part of the adjusting buckle for connecting the binding strap; an adjusting groove is formed at the rear part of the adjusting buckle; each adjusting groove defines a locking position and a adjusting position; the movable shaft can movably sliding in the adjusting grooves, and the fixed shaft is fixed below the adjusting grooves. In the present invention, the binding strap is movably connected with the mainframe, so that the position of the mainframe can be adjusted according to needs under different usage conditions, the operation is convenient, and the overall device is simple and practical.

7 Claims, 7 Drawing Sheets

ADJUSTABLE RATCHET TIE DOWN

FIELD OF THE INVENTION

The present invention relates to a tie-down ratchet used in an automobile, a truck, a trailer or a motorcycle for conveniently binding and fixing goods.

BACKGROUND OF THE INVENTION

The conventional tie-down ratchet is composed of a tensioning device mainframe, a long binding strap, a short binding strap and the like. The mainframe adopts the anti-reverse ratchet wheel mechanism principle, a handle directly drives a driving pawl, the driving pawl pushes ratchet wheels, the ratchet wheels directly drive a main rotating shaft, the binding strap wound around the main rotating shaft is thus tensioned, a locking pawl prevents the ratchet wheels from reversing, and certain tension can be kept on the binding strap to bind and fix goods. In addition, one end of the long binding strap in the existing tie-down ratchet is provided with a hook, and the other end is a free end and penetrates through the mainframe in operation; one end of the short binding strap is provided with a hook, and the other end is directly fixedly connected with the mainframe, which means that the position of the mainframe is fixed relative to the hook on the short binding strap, which results in a shortcoming that the position of the mainframe is non-adjustable relative to the goods. Because practical service environments and situations are different, if the position of the mainframe just intervenes with other article, the binding operation is inconvenient, even the mainframe or the goods are instable, and certain potential safety hazards exist, e.g., the goods easily drop, or the mainframe is loosened so that the binding strap is loosened and released, etc.

SUMMARY OF THE INVENTION

A technical problem to be solved by the present invention is to provide an adjustable tie-down ratchet in which the distance between a mainframe and a hook is not fixed, i.e., the position of the mainframe can be adjusted when goods are bound and fixed, in view of the current situation of the prior art.

To solve the technical problem, the adjustable tie-down ratchet for adjusting a binding strap, comprises a positional base having two side walls and each side wall having an adjusting groove; a fixed shaft installed between the two side walls of the positional base; a movable shaft installed between the two side walls, the movably shaft movably sliding in the adjusting grooves; an adjustable base attached to the positional base, the positional base and the adjustable base forming a mainframe; a handle movably attached to the adjustable base; a transmission mechanism, disposed in the adjustable base and activated by the handle, formed by a main rotating shaft; wherein, the main rotating shaft is composed of two semicircular shafts; each adjusting groove defines a locking position and an adjusting position;

when the movable shaft is at the locking position, the binding strap winds around the movable shaft and the fixed shaft and cannot move freely, and when the movable shaft is at the adjusting position, the binding strap winds around the movable shaft and can move freely.

In this case, the movable shaft is just moved to the adjusting position before the binding strap is tensioned, and is moved to the locking position after adjustment.

Preferably, one installing hole is formed below each adjusting groove on each side wall, and two ends of the fixed shaft are respectively fixed in the installing holes of the two side walls. After the positional base adopts the above structure, not only the structure is firm, but also the movable shaft and the fixed shaft can be installed firmly.

Preferably, the adjusting grooves are C-shaped with an downward opening, the front end of each of the C-shaped adjusting groove is the adjusting position, the rear end of each of the C-shaped adjusting groove is the locking position, and the position of the fixed shaft is parallel to a line defined between the adjusting positions on each adjusting groove and also parallel to a line defined between the locking positions on each adjusting groove. More preferably, when the movable shaft moves to the adjusting position, the included angle between the connecting line of axes of the fixed shaft and the movable shaft and the binding strap is close to 180 degrees, and when the movable shaft moves to the locking position, the included angle between the connecting line of axes of the fixed shaft and the movable shaft and the binding strap is close to 0 degree.

Preferably, the binding strap is a conjoined binding strap, and two hooks are respectively fixed at two ends of the conjoined binding strap; when the movable shaft is at the locking position, the conjoined binding strap winds around the main rotating shaft, the fixed shaft and the movable shaft successively; and when the movable shaft is at the adjusting position, the conjoined binding band winds around the main rotating shaft and the movable shaft successively.

The transmission mechanism can adopt multiple structures, preferably, the transmission mechanism is a ratchet wheel transmission mechanism, the ratchet wheel transmission mechanism comprises the main rotating shaft, a ratchet wheel disposed on the main rotating shaft as well as a driving pawl assembly and a locking pawl assembly matched with the ratchet wheels, and the driving pawl assembly and the locking pawl assembly are respectively arranged on the handle and the adjustable base.

As another preferred solution of the binding strap, the binding strap comprises a tensioning strap having an inner end and an outer end and an adjusting strap having an inner end and an outer end which are separated from each other; a hook is respectively fixed at the outer end of the tensioning strap and the outer end of the adjusting strap; the inner end of the tensioning strap is a free end and is connected to the main rotating shaft, and the inner end of the adjusting strap is a free end and is connected to the movable shaft and the fixed shaft.

Compared with the prior art, the adjustable tie-down ratchet has the following advantages: the adjustable base and the positional base together form an adjusting buckle; a movable shaft and a fixed shaft for connecting the binding strap are arranged in back of the adjusting buckle, the movable shaft and the fixed shaft are arranged in parallel to the main rotating shaft in the front of the adjusting buckle, the binding strap can be wound and interlaced on the two connecting shafts, and the binding strap is movably connected with the mainframe, so that the position of the mainframe can be adjusted according to needs under different using conditions, the operation is convenient, and the overall device is simple and practical.

DETAILED DESCRIPTION OF THE EMBODIMENTS

The present invention will be further described in detail below in combination with the accompanying drawings.

Embodiment 1

As shown in FIGS. 1-8, an adjustable tie-down ratchet in this Embodiment comprises a mainframe 1 and a binding strap 2 installed on the mainframe 1, wherein the mainframe 1 comprises an adjusting buckle 4 composed of the adjustable base 4a and the positional base 4b connected with the adjustable base 4a, a handle 12 movably attached to the adjustable base 4a and a transmission mechanism disposed in the adjustable base 4a and activated by the handle 12 and can prevent reversing.

In this embodiment, the adjustable base 4a is connected with the positional base 4b by a screw 46 and a nut 47, of course, the screw 46 and the nut 47 can also be replaced by a rivet shaft. The adjustable base 4a can be connected with the positional base 4b by other means.

The adjustable base 4a and the positional base 4b are respectively provided with a left sheet and a right sheet which are arranged symmetrically, the two front-back corresponding left sheets in the adjustable base 4a and the positional base 4b form an adjusting buckle left sheet 41, and the two front-back corresponding right sheets in the adjustable base 4a and the positional base 4b form an adjusting buckle right sheet 42; a main rotating shaft 8 for winding the binding strap 2 is installed in the front of the adjusting buckle 4, i.e., the front of the adjustable base 4a, an adjusting groove 20 is formed at the rear part of each of the adjusting buckle left sheet 41 and the adjusting buckle right sheet 42 (i.e., in the positional base 4b of the adjusting buckle 4), two ends of a movable shaft 6 are respectively movably connected into the adjusting grooves 20 of the adjusting buckle left sheet 41 and the adjusting buckle right sheet 42, an installing hole 43 is respectively formed below the adjusting groove 20 of the adjusting buckle left sheet 41 and below the adjusting groove 20 of the adjusting buckle right sheet 42, and two ends of a fixed shaft 5 are respectively fixed in the installing holes 43 of the adjusting buckle left sheet 41 and the adjusting buckle right sheet 42. In this embodiment, the movable shaft 6 is a first connecting shaft for connecting the binding strap 2, the fixed shaft 5 is a second connecting shaft for connecting the binding strap 2, and the movable shaft 6, the fixed shaft 5 and the main rotating shaft 8 are arranged in parallel.

In this embodiment, the adjusting groove 20 is C-shaped with an downward opening, the movable shaft 6 penetrates through the adjusting groove 20 to form movable connection, the front end of each of the C-shaped adjusting groove 20 is an adjusting position 19, the rear end of each of the C-shaped adjusting groove 20 is a locking position 18, the installing hole 43 is located between the adjusting position 19 and the locking position 18, and the position of the fixed shaft 5 (i.e., the installing hole 43) is parallel to a line defined between the adjusting positions on each adjusting groove 19 and also parallel to a line defined between the locking positions 18 on each adjusting groove 20.

The binding strap 2 is a conjoined binding strap, the conjoined binding strap 2 is divided into a binding strap tensioning section wound around the main rotating shaft 8 and a binding strap adjusting section connected to the fixed shaft 5 and the movable shaft 6, and two hooks 3 are respectively fixed at two ends of the conjoined binding strap. When the movable shaft 6 is at the locking position 18, the conjoined binding strap winds around the main rotating shaft 8, the fixed shaft 5 and the movable shaft 6 successively to bear tension; and when the movable shaft 6 is at the adjusting position 19, the conjoined binding strap winds around the main rotating shaft 8 and the movable shaft 6 successively and can move freely.

The handle 12 comprises a handle left sheet 121 and a handle right sheet 122, wherein the front end of the handle left sheet 121 is installed on the adjusting buckle left sheet 41, the front end of the handle right sheet 122 is installed on the adjusting buckle right sheet 42, and a driving handle 13 is installed between the rear end of the handle left sheet 121 and the rear end of the handle right sheet 122.

The ratchet wheel transmission mechanism comprises the main rotating shaft 8, a ratchet wheel 7 disposed on the main rotating shaft as well as a driving pawl assembly and a locking pawl assembly matched with the ratchet wheels. The main rotating shaft 8 is installed in the front of the adjusting buckle 4, and the driving pawl assembly and the locking pawl assembly are respectively arranged on the handle 12 and the adjusting buckle 4. Specifically, a main rotating shaft installing hole 44 is respectively formed at the front parts of the adjusting buckle left sheet 41 and the adjusting buckle right sheet 42 (i.e., in the adjustable base 4a of the adjusting buckle 4), two ends of two semicircular shafts respectively penetrate through the main rotating shaft installing holes 44 on two sides and then are fixedly connected by a pin 11 to form the main rotating shaft 8, the ratchet wheels 7 are installed on the main rotating shaft 8, and there are two ratchet wheels 7 which are clamped between the handle 12 and the adjusting buckle 4. The driving pawl assembly comprises a driving pawl 14 and a torsion spring 15, two sides of the driving pawl 14 are respectively installed in first slotted holes 123 of the left handle 121 and the right handle 122, and the torsion spring 15 is installed in the first slotted hole of the handle on one side and can apply acting force to the driving pawl 14. The locking pawl assembly includes a locking pawl 9 and a pressure spring 10, two sides of the locking pawl 9 are respectively installed in second slotted holes 45 of the adjusting buckle left sheet 41 and the adjusting buckle right sheet 42, the front and rear ends of the pressure spring 10 respectively abut against the rear end of the locking pawl 9 and the adjusting buckle 4, and the pressure spring 10 can apply force to the locking pawl 9 to prevent the ratchet wheels 7 from reversing, so that the binding strap 2 can keep certain tension to bind and fix goods. For the ratchet wheel transmission mechanism in this embodiment, reference can be made to the existing tie-down ratchet, and the specific action principle and action process are no longer described in detail.

Figure 1:
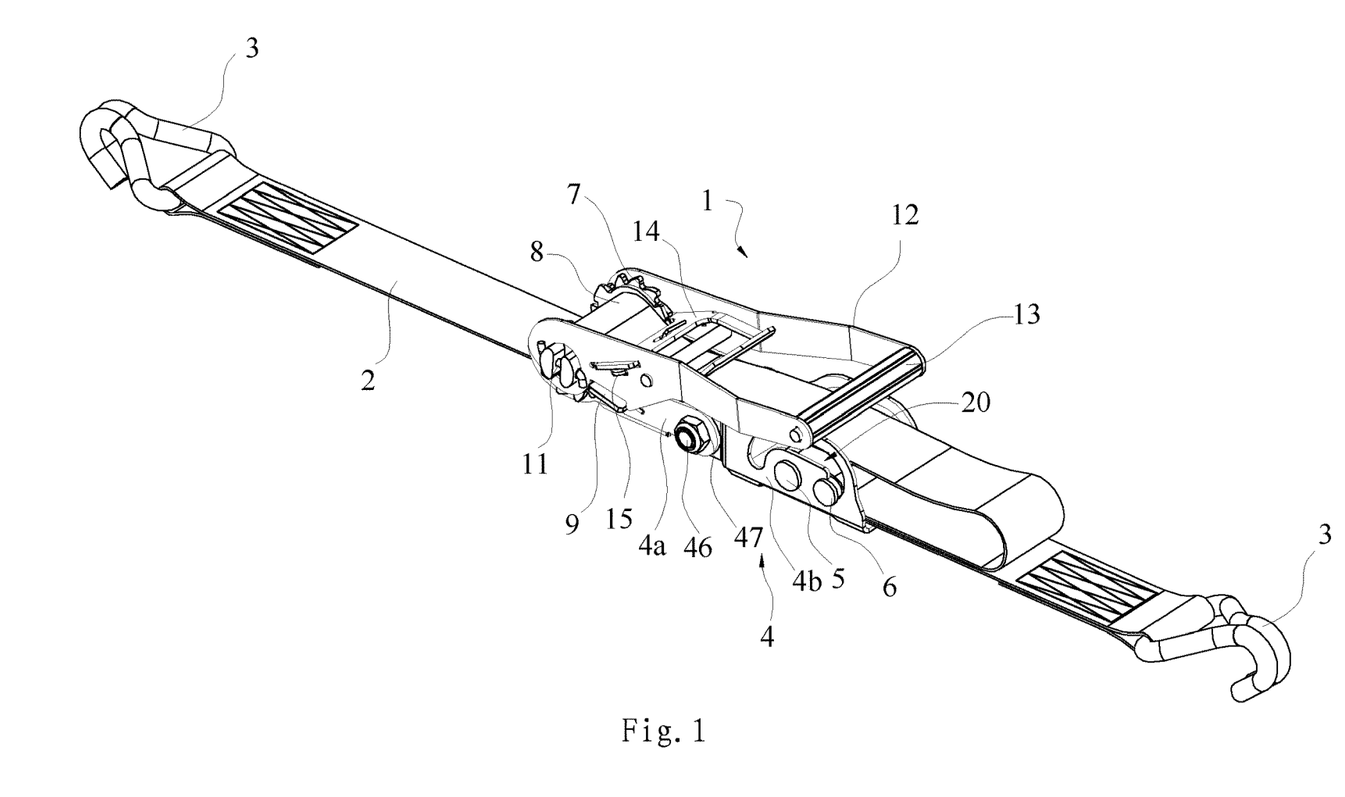
FIG. 1 is a perspective view of an adjustable tie-down ratchet according to Embodiment 1 of the present invention.
Figure 2:
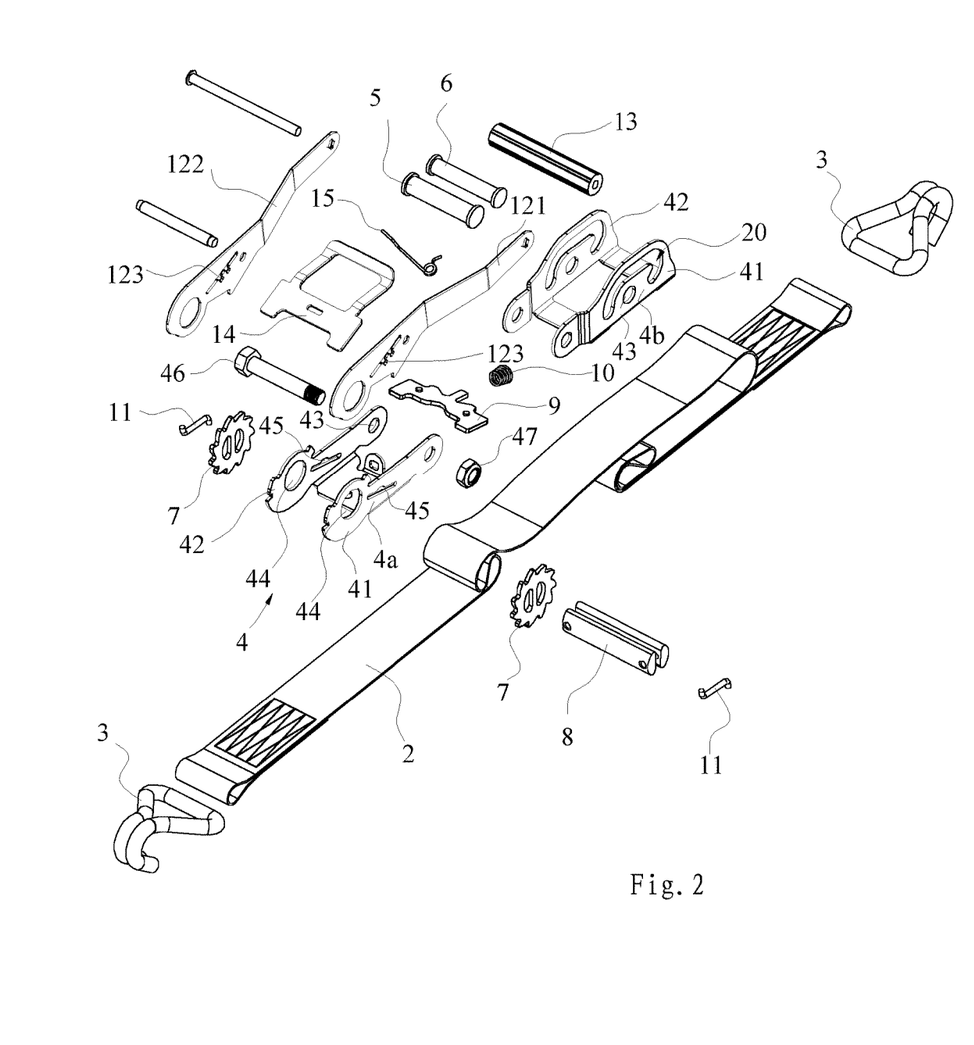
FIG. 2 is a exploded view of the adjustable tie-down ratchet according to Embodiment 1 of the present invention.
Figure 3:
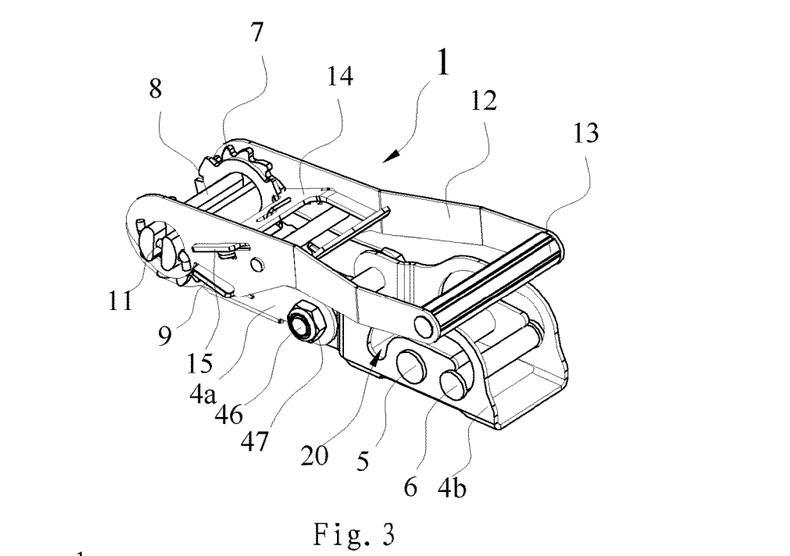
FIG. 3 is a perspective view of connecting assembly of a mainframe and an adjusting buckle according to Embodiment 1 of the present invention.
Figure 4:
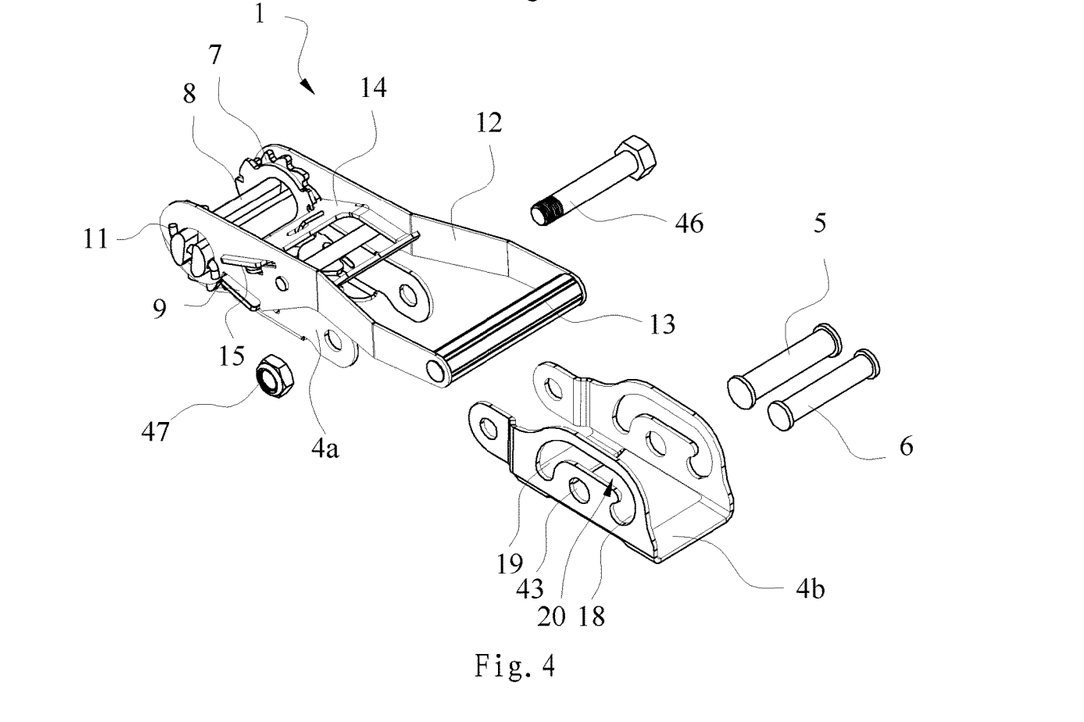
FIG. 4 is an exploded view of connecting assembly of the mainframe and the adjusting buckle according to Embodiment 1 of the present invention.
Figure 5:
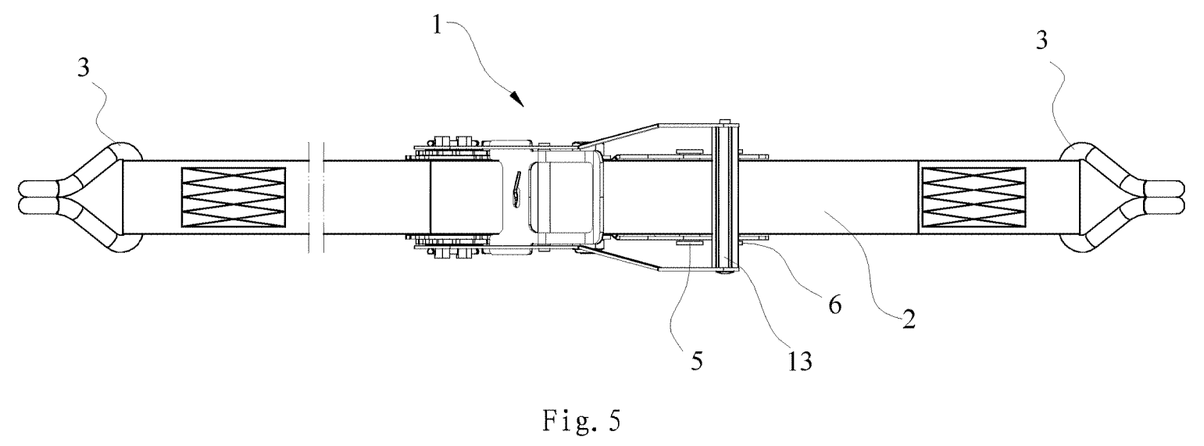
FIG. 5 is a top view of the adjustable tie-down ratchet according to Embodiment 1 of the present invention.
Figure 6:
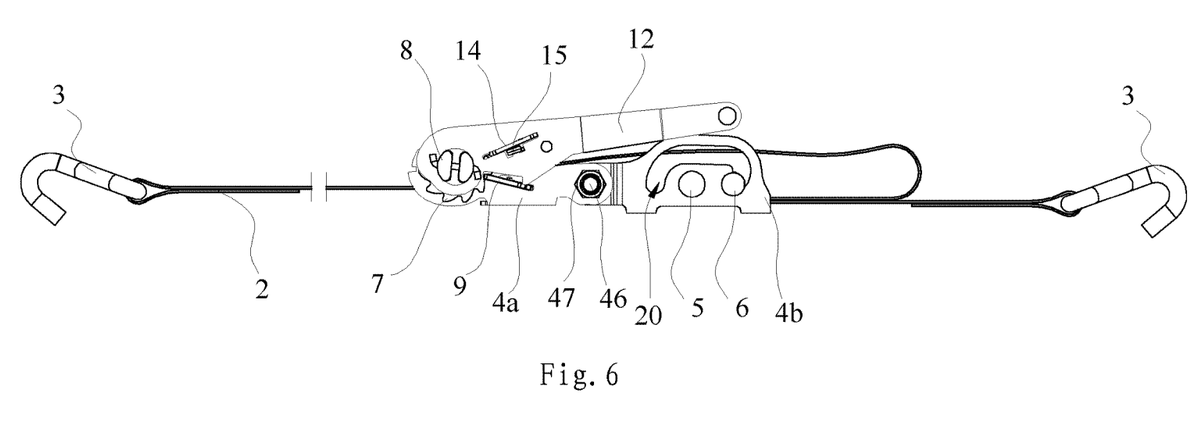
FIG. 6 is a front view of the adjustable tie-down ratchet according to Embodiment 1 of the present invention.
Figure 7:
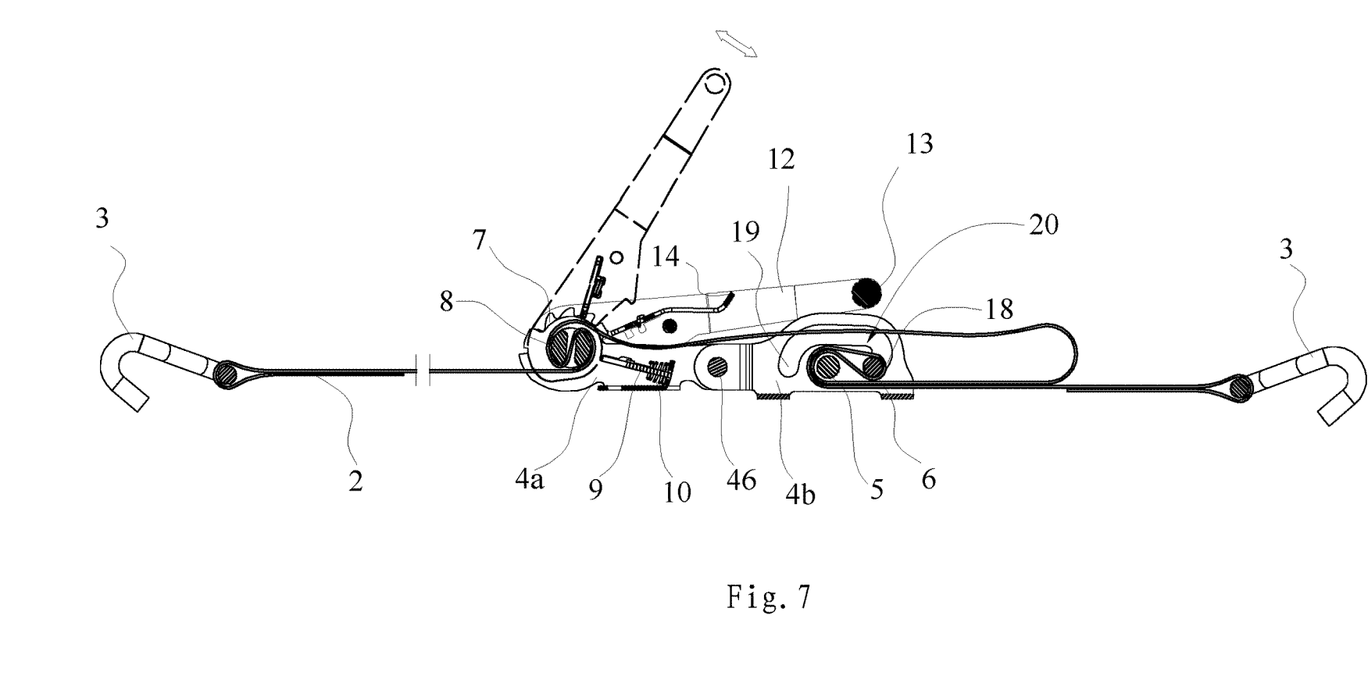
FIG. 7 is a perspective view of a binding strap winding mode in a stressed state according to Embodiment 1 of the present invention.

As shown in FIG. 7, the binding strap 2 winds around the fixed shaft 5 and the movable shaft 6 crosswise while penetrating through the main rotating shaft 8, the movable shaft 6 is located at the locking position 18 of the adjusting groove, the included angle between the connecting line of axes of the fixed shaft 5 and the movable shaft 6 and the binding strap adjusting section is close to 0 degree, displacement is not produced between the binding strap 2 and the mainframe 1 at the moment due to the friction between the binding strap and the fixed shaft and between the binding strap and the movable shaft, and the binding strap can bear certain tension. Later, the binding strap is tensioned, hand power is applied to the driving handle 13 during tensioning, the handle 12 drives the driving pawl 14 to rotate, and then the driving pawl 14 drives the main rotating shaft 8 connected with the ratchet wheels 7 to rotate, so that the binding strap 2 tensioning section winds around the main rotating shaft 8 to gradually produce tension on the binding strap 2.

Figure 8:
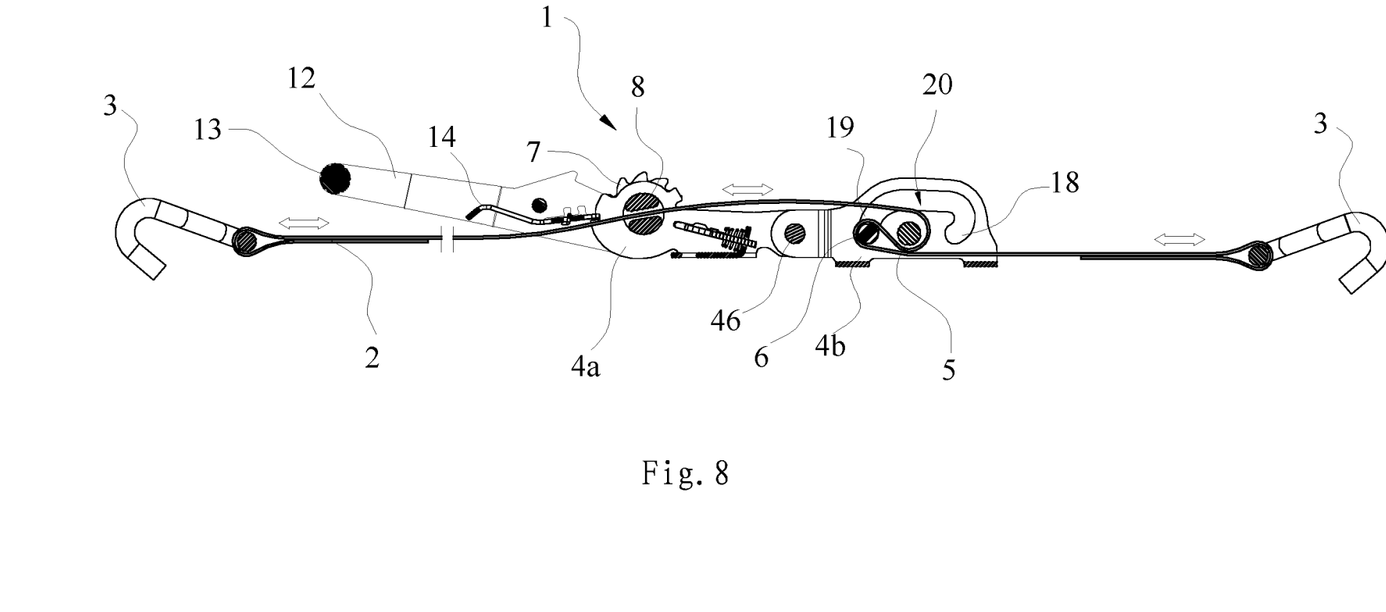
FIG. 8 is a perspective view of the adjustable tie-down ratchet in an adjustable state according Embodiment 1 of the present invention.

As shown in FIG. 8, the binding strap is not stressed before the tensioning operation of the binding strap 2, the movable shaft 6 is moved to the adjusting position 19, the included angle between the connecting line of axes of the fixed shaft 5 and the movable shaft 6 and the binding strap adjusting section is close to 180 degrees, and the binding strap adjusting section can move freely in the arrow direction of the figure, so that the position of the mainframe 1 relative to the hooks 3 fixed on the binding strap adjusting section can be adjusted.

Embodiment 2

Figure 9:
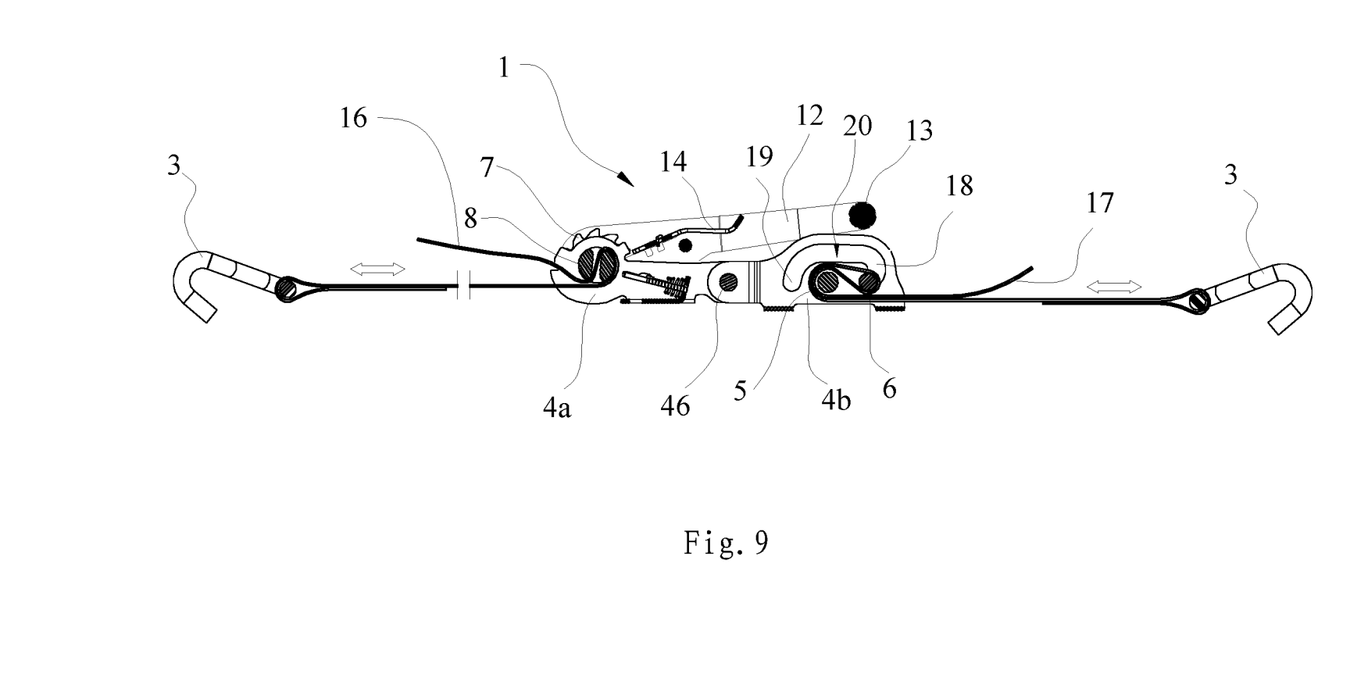
FIG. 9 is a perspective view of an adjustable tie-down ratchet in an adjustable state according to Embodiment 2 of the present invention.

As shown in FIG. 9, in this embodiment, the binding strap is divided into two sections, which are respectively a tensioning strap 16 and an adjusting strap 17. A hook 3 is respectively fixed at the outer end of the tensioning strap 16 and the outer end of the adjusting strap 17, the inner end of the tensioning strap 16 is a free end and is connected to the main rotating shaft 8, and the inner end of the adjusting strap 17 is a free end and is connected to the movable shaft 6 and the fixed shaft 5. During adjustment, the adjusting strap 17 can be adjusted in the arrow direction of the figure, and its adjusting method is same as the binding strap adjusting method in Embodiment 1. In addition, the tensioning operation of the tensioning strap 16 is same as that of the binding strap in Embodiment 1, and thus is not described herein.

Described above are merely preferred embodiments of the present invention. It should be noted that many modifications or improvements may be made to the present invention for those of ordinary skill in the art without departing from the principle of the present invention, for example, when the binding strap is stressed, the included angle between the connecting line of axes of the fixed shaft and the movable shaft and the binding strap is not limited to be close to 0 degree in this embodiment, as long as the included angle can guarantee that displacement is not produced between the binding strap and the mainframe when the binding strap is stressed and the binding strap can bear certain tension; similarly, before the binding strap is tensioned, the included angle between the connecting line of axes of the fixed shaft and the movable shaft and the binding strap is not limited to be close to 180 degrees, as long as the included angle can guarantee that the binding strap can move freely when the binding strap is not stressed so that the mainframe and the binding strap can move relatively, and these are deemed as within the protection scope of the present invention.

The invention claimed is:

1. An adjustable tie-down ratchet for adjusting a binding strap, comprising:
    a positional base having two side walls and each side wall having an adjusting groove;
    a fixed shaft installed between the two side walls of the positional base;
    a movable shaft installed between the two side walls, the movably shaft movably sliding in the adjusting grooves;
    an adjustable base attached to the positional base, the positional base and the adjustable base forming a mainframe;
    a handle movably attached to the adjustable base;
    a transmission mechanism, disposed in the adjustable base and activated by the handle, formed by a main rotating shaft;
    wherein,
    the main rotating shaft is composed of two semicircular shafts;
    each adjusting groove defines a locking position and an adjusting position;
    when the movable shaft is at the locking position, the binding strap is wound on the movable shaft and the fixed shaft and cannot move freely, and when the movable shaft is at the adjusting position, the binding strap is wound on the movable shaft and can move freely.

2. The tie-down ratchet of claim 1, wherein one installing hole is formed below each adjusting groove on each side wall, and two ends of the fixed shaft are respectively fixed in the installing holes of the two side walls.

3. The tie-down ratchet of claim 1, wherein the adjusting grooves are C-shaped with an downward opening, the front end of each of the C-shaped adjusting groove is the adjusting position, the rear end of each of the C-shaped adjusting groove is the locking position, and the position of the fixed shaft is parallel to a line defined between the adjusting positions on each adjusting groove and also parallel to a line defined between the locking positions on each adjusting groove.

4. The tie-down ratchet of claim 1, wherein the binding strap is a conjoined binding strap, and two hooks are respectively fixed at two ends of the conjoined binding strap;
    when the movable shaft is at the locking position, the conjoined binding strap winds around the main rotating shaft, the fixed shaft and the movable shaft successively; and
    when the movable shaft is at the adjusting position, the conjoined binding band winds around the main rotating shaft and the movable shaft successively.

5. The tie-down ratchet of claim 1, wherein the transmission mechanism is a ratchet wheel transmission mechanism, the ratchet wheel transmission mechanism comprises the main rotating shaft, a ratchet wheel disposed on the main rotating shaft as well as a driving pawl assembly and a locking pawl assembly matched with the ratchet wheels, and the driving pawl assembly and the locking pawl assembly are respectively arranged on the handle and the adjustable base.

6. The tie-down ratchet of claim 1, wherein the binding strap comprises a tensioning strap having an inner end and an outer end and an adjusting strap having an inner end and an outer end which are separated from each other;
 a hook is respectively fixed at the outer end of the tensioning strap and the outer end of the adjusting strap;
 the inner end of the tensioning strap is a free end and is connected to the main rotating shaft, and the inner end of the adjusting strap is a free end and is connected to the movable shaft and the fixed shaft.

7. The tie-down ratchet of claim 1, further comprising an adjusting buckle composed of the adjustable base and the positional base connected with the adjustable base.

\* \* \* \* \*